(12) United States Patent
Son et al.

(10) Patent No.: US 9,402,149 B2
(45) Date of Patent: Jul. 26, 2016

(54) TETHERING PROVIDING SYSTEM AND METHOD USING SHORT DISTANCE COMMUNICATION

(71) Applicant: SK PLANET CO., LTD., Seoul (KR)

(72) Inventors: Dae Lim Son, Seoul (KR); Eun Bok Lee, Seoul (KR)

(73) Assignee: SK PLANET CO., LTD., Seoul (KR)

( * ) Notice: Subject to any disclaimer, the term of this patent is extended or adjusted under 35 U.S.C. 154(b) by 128 days.

(21) Appl. No.: 14/238,008

(22) PCT Filed: Aug. 7, 2013

(86) PCT No.: PCT/KR2013/007125
§ 371 (c)(1),
(2) Date: Feb. 10, 2014

(87) PCT Pub. No.: WO2014/069758
PCT Pub. Date: May 8, 2014

(65) Prior Publication Data
US 2015/0304800 A1    Oct. 22, 2015

(30) Foreign Application Priority Data

Oct. 30, 2012  (KR) .................. 10-2012-0120988

(51) Int. Cl.
*H04W 4/00* (2009.01)
*H04B 7/24* (2006.01)
*H04W 88/04* (2009.01)
*H04W 92/18* (2009.01)
*H04W 76/04* (2009.01)
*H04W 52/02* (2009.01)
*H04W 84/00* (2009.01)
*H04W 88/02* (2009.01)

(52) U.S. Cl.
CPC ............. *H04W 4/008* (2013.01); *H04B 7/24* (2013.01); *H04W 4/005* (2013.01); *H04W 52/0209* (2013.01); *H04W 76/04* (2013.01); *H04W 88/04* (2013.01); *H04W 92/18* (2013.01); *H04W 84/005* (2013.01); *H04W 88/02* (2013.01)

(58) Field of Classification Search
CPC ... H04W 84/005; H04W 48/18; H04W 12/06; H04W 88/08; H04W 88/06; B60R 25/20; G06Q 50/30; H04L 61/6022
See application file for complete search history.

(56) References Cited

U.S. PATENT DOCUMENTS

| 2004/0125775 A1* | 7/2004 | Rios ...................... H04W 40/02 370/338 |
| 2010/0015919 A1* | 1/2010 | Tian ...................... H04W 8/005 455/41.2 |
| 2011/0112969 A1* | 5/2011 | Zaid ....................... G06Q 10/02 705/50 |
| 2012/0039248 A1* | 2/2012 | Schneider ........... H04W 84/005 370/328 |

* cited by examiner

FOREIGN PATENT DOCUMENTS

| KR | 1020120018518 A | 3/2012 |
| KR | 1020120070344 A | 6/2012 |
| KR | 1020120108519 A | 10/2012 |
| KR | 1020120116924 | 10/2012 |

OTHER PUBLICATIONS

Bluetooth, Bluetooth Core_V4.0, 2010.*
iPhone-4S-User-Guide-iOS-5.0, Apple, 2011 http://www.iphone4smanual.com/wp-content/uploads/2012/10/Apple-iPhone-4S-User-Guide-iOS-5.0.pdf.*
Written Opinion of the International Searching Authority for PCT/KR2013/007125, mailed Nov. 19, 2013, citing the above reference(s).

*Primary Examiner* — Ping Hsieh
*Assistant Examiner* — James Yang
(74) *Attorney, Agent, or Firm* — Hauptman Ham, LLP

(57) ABSTRACT

Provided are a tethering providing system and method using short distance communication. More particularly, second short distance communication tethering between a vehicle terminal device and a communication terminal device is set in accordance with whether first short distance communication is established, activated when the vehicle terminal device and the communication terminal device are re-connected through the first short distance communication, and deactivated when the first short distance communication is terminated, thereby providing high-speed data connection through the second short distance communication tethering while reducing battery consumption of the communication terminal device.

10 Claims, 12 Drawing Sheets

TETHERING PROVIDING SYSTEM AND METHOD USING SHORT DISTANCE COMMUNICATION

TECHNICAL FIELD

The present invention relates to a tethering providing system and method using short distance communication, and more particularly, to a tethering providing system and method using short distance communication in which second short distance communication tethering between a vehicle terminal device and a communication terminal device is set in accordance with whether first short distance communication is established, activated when the vehicle terminal device and the communication terminal device are re-connected through the first short distance communication, and deactivated when the first short distance communication is terminated, and therefore high-speed data connection may be provided through the second short distance communication tethering while reducing battery consumption of the communication terminal device.

BACKGROUND ART

As vehicles become "smarter," connection between vehicles and devices is developing as an essential trend. Connection between vehicles and driver's devices is currently developing from wired cables to short distance communication (for example, Bluetooth, and the like). In vehicle smart technologies using such wired cables or Bluetooth, multimedia data such as music and small amounts of control data such as music selection/stop/play are transmitted to be provided to a user. In addition, hands-free data transmission technologies in which mobile phones are conveniently used in the vehicle are also being added.

The above-described Bluetooth technology is technology using low power compared to other wireless technologies. Thus, the Bluetooth technology is essentially adopted and applied in smart devices. However, since the Bluetooth technology uses a low-power profile to have a speed of 1 Mbps, the Bluetooth technology is suitable for low-speed data transmission. The Bluetooth technology is utilized in music transmission and hands-free data which are suitable for a low speed. On the other hand, in high-speed data transmission of 10 Mbps or more, Wi-Fi based wireless transmission technologies are used. However, a Wi-Fi function is set to be turned ON/OFF by a user's selection due to a battery problem of a smart device. In particular, since a user of a smart device should continuously look ahead while driving a vehicle, selecting Wi-Fi ON/OFF functions in the vehicle may cause safety problems during driving.

In recent years, smart phones have provided such a Wi-Fi tethering function that an external device can use high-speed Internet access such as Wi-Fi of the smart phone. Tethering refers to technology in which a high-speed Internet connection of the smart phone is shared by connecting a smart device without a communication function and the smart phone via Wi-Fi. The number of smart devices capable of being connected may be determined depending on performance of the smart phone. Thus, a large number of smart devices may provide Internet services to users through tethering as if they were connected to the Internet.

Meanwhile, a development period of the vehicle industry is two or three years, which is two or three times the current development period of smart devices. Information services used in the most recently released vehicles always correspond to information of smart devices from about two to three years prior, and therefore a sales volume of such smart devices may not be high.

In order to overcome this problem, products in which basic functions and communication functions of a vehicle are separated have been developed. The basic functions of the vehicle are developed for two or three years before being released, but the communication functions are separately released. In this instance, services are provided by connection with available smart communication devices. When Wi-Fi tethering technology is applied to such functions, vehicle smart services using high-speed data connection can be provided.

However, the Wi-Fi tethering technology consumes large amounts of the smart phone's battery power, and therefore a user's operation is needed in the smart phone. As described above, such user's operation may cause safety problems while driving. Thus, technologies for automatically connecting Wi-Fi tethering have not been commercialized yet.

DISCLOSURE

Technical Problem

The present invention is directed to providing to a tethering providing system and method using short distance communication in which second short distance communication tethering between a vehicle terminal device and a communication terminal device is set in accordance with whether first short distance communication is established, activated when the vehicle terminal device and the communication terminal device are re-connected through the first short distance communication, and deactivated when the first short distance communication is terminated, and therefore high-speed data connection may be provided through the second short distance communication tethering while reducing battery consumption of the communication terminal device.

Technical Solution

A first aspect of the present invention provides a tethering providing system using short distance communication, including: a vehicle terminal device that requests setting of second short distance communication tethering in advance through first short distance communication, and receives, when the second short distance communication tethering is activated through re-connection of the first short distance communication, service connection or service data through the activated second short distance communication tethering; a communication terminal device that sets the second short distance communication tethering through the first short distance communication with the vehicle terminal device, activates the set second short distance communication tethering when re-connected with the vehicle terminal device through the first short distance communication, and relays service connection or service data through the activated second short distance communication tethering; and a service providing device that provides service connection or service data to the vehicle terminal device through the relayed communication terminal device.

A second aspect of the present invention provides a vehicle terminal device including: a first short distance communication unit that communicates with a communication terminal device through first short distance communication; a second short distance communication unit that communicates with the communication terminal device through second short distance communication; a storage unit that stores tethering setting information for setting second short distance communication tethering; and a control unit that requests setting of the second short distance communication tethering in advance from the communication terminal device through the first short distance communication unit to store the tethering setting information in the storage unit, transmits the stored tethering setting information to the communication terminal device through re-connection of the first short distance communication with the communication terminal device, and receives, when the second short distance communication tethering is activated, service connection or service data through the activated second short distance communication tethering.

A third aspect of the present invention provides a communication terminal device including: a first short distance communication unit that communicates with a vehicle terminal device through first short distance communication; a second short distance communication unit that communicates with the vehicle terminal device through second short distance communication; a communication unit that communicates with a service providing device through a communication network; a storage unit that stores identification information of the vehicle terminal device and tethering setting information for setting second short distance communication tethering; and a control unit that sets the second short distance communication tethering with the vehicle terminal device through the first short distance communication unit, activates the set second short distance communication tethering by verifying the identification information of the vehicle terminal device and the tethering setting information when re-connected with the vehicle terminal device through the first short distance communication unit, and relays service connection or service data between the vehicle terminal device and the service providing device through the activated second short distance communication tethering.

A fourth aspect of the present invention provides a tethering providing method including: requesting setting of second short distance communication tethering in advance from a communication terminal device through first short distance communication; setting the second short distance communication tethering by storing tethering setting information generated by the requesting of the setting; requesting the second short distance communication tethering by transmitting the stored tethering setting information to the communication terminal device through re-connection of first short distance communication with the communication terminal device; and receiving, when the second short distance communication tethering is activated in the communication terminal device, service connection or service data through the activated second short distance communication tethering.

A fifth aspect of the present invention provides a tethering providing method including: performing connection with a vehicle terminal device through first short distance communication; setting second short distance communication tethering with the vehicle terminal device through the first short distance communication; performing re-connection with the vehicle terminal device through the first short distance communication; activating the set second short distance communication tethering by verifying identification information of the vehicle terminal device and tethering setting information; and relaying service connection or service data between the vehicle terminal device and the service providing device through the activated second short distance communication tethering.

A sixth aspect of the present invention provides a computer readable recording medium which records a program for executing a method including: requesting setting of second short distance communication tethering in advance from a communication terminal device through first short distance communication; setting the second short distance communication tethering by storing tethering setting information generated by the requesting of the setting; requesting the second short distance communication tethering by transmitting the stored tethering setting information to the communication terminal device through re-connection of first short distance communication with the communication terminal device; and receiving, when the second short distance communication tethering is activated in the communication terminal device, service connection or service data through the activated second short distance communication tethering.

A seventh aspect of the present invention provides a computer readable recording medium which records a program for executing a method including: performing connection with a vehicle terminal device through first short distance communication; setting second short distance communication tethering with the vehicle terminal device through the first short distance communication; performing re-connection with the vehicle terminal device through the first short distance communication; activating the set second short distance communication tethering by verifying identification information of the vehicle terminal device and tethering setting information; and relaying service connection or service data between the vehicle terminal device and the service providing device through the activated second short distance communication tethering.

An eighth aspect of the present invention provides a computer readable recording medium which records a program for executing a method including: setting second short distance communication tethering in advance by storing tethering setting information through first short distance communication; performing re-connection through the first short distance communication; activating the set second short distance communication tethering by verifying the second short distance communication tethering and the stored tethering setting information through re-connection of the first short distance communication; and receiving service connection or service data by communicating with the service providing device through the activated second short distance communication tethering.

Advantageous Effects

As described above, according to embodiments of the present invention, second short distance communication tethering between a vehicle terminal device and a communication terminal device is set in accordance with whether first short distance communication is established, activated when the vehicle terminal device and the communication terminal device are re-connected through the first short distance communication, and deactivated when the first short distance communication is terminated, and therefore high-speed data connection may be provided through the second short distance communication tethering while reducing battery consumption of the communication terminal device.

Also, according to embodiments of the present invention, high-speed data option such as second short distance communication tethering (for example, Wi-Fi) of a communication terminal device may be automatically controlled using first short distance communication (for example, Bluetooth) connection through which a device can always be turned on and carried without any battery problem, and therefore a user may freely use high-speed data without inconvenience even in a vehicle.

Furthermore, according to embodiments of the present invention, by reducing a technology gap between a vehicle development speed and a communication development speed, vehicle services may be easily developed using the latest technologies of communication terminal devices such as smart communication devices even in a vehicle.

MODES OF THE INVENTION

Figure 1:
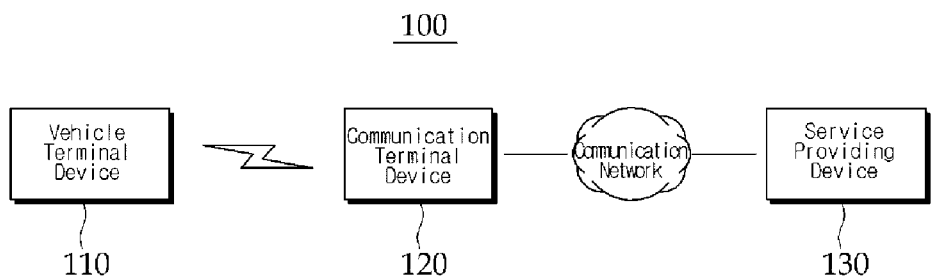
FIG. 1 is a configuration diagram of a tethering providing system using short distance communication according to an embodiment of the present invention.

Hereinafter, exemplary embodiments of the present invention will be described in detail. However, the present invention is not limited to the exemplary embodiments disclosed below, but can be implemented in various forms. The following exemplary embodiments are described in order to enable those of ordinary skill in the art to embody and practice the invention. When it is determined that the detailed description of known art related to the present invention may obscure the gist of the present invention, the detailed description thereof will be omitted. The same reference numerals are used to refer to the same element throughout the specification. The relative size and depiction of these elements may be exaggerated for clarity, illustration, and convenience.

FIG. 1 is a configuration diagram of a tethering providing system 100 using short distance communication according to an embodiment of the present invention.

As shown in FIG. 1, the tethering providing system 100 using the short distance communication includes a vehicle terminal device 110, a communication terminal device 120, and a service providing device 130. The communication terminal device 120 and the service providing device 130 are connected to each other through a communication network. Here, the communication network supports signal transmission and reception required for data communication services between the communication terminal device 120 and the service providing device 130. That is, when the communication terminal device 120 requests data communication from the service providing device 130, the communication network transmits an access request for the use of services of the communication terminal device 120 to the service providing device 130, and transmits data supported by the service providing device 130 to the communication terminal device 120 in accordance with whether the service providing device 130 permits the access request. Such a communication network may support at least one communication method among various communication methods. That is, the communication network may be an IP network in which transmission and reception services of a large amount of data and seamless data services are provided using IP, or an ALL-IP network, that is, an IP network structure in which mutually different networks are integrated based on IP. In addition, the communication network may include a wired communication network, a mobile communication network including at least one radio access system among a 3rd Generation Partnership Project (3GPP) system, a 3GPP long term evolution (LTE), an LTE-Advanced (LTE-A) system, and a 3GPP2 system, a wireless broadband (WiBro) network, a high-speed downlink packet access (HSDPA) network, a wireless local area network (WLAN) including a Wi-Fi network, a satellite communication network, other wired/wireless networks which have been widely known or will be developed in the future, or a combination thereof.

The vehicle terminal device 110 may be a terminal which cannot directly access the communication network, but can indirectly access the communication network through the communication terminal device 120. The vehicle terminal device 110 and the communication terminal device 120 may be integrally or detachably mounted in a vehicle, and are not limited to a specific type mounted in the vehicle. When initially integrally mounted in the vehicle, the vehicle terminal device 110 and the communication terminal device 120 are not required to be separated from each other. Here, for convenience of description of the present invention, a configuration in which the vehicle terminal device 110 and the communication terminal device 120 are separated from each other will be described.

Such a vehicle terminal device 110 may perform communication with the communication terminal device 120 through first short distance communication. The vehicle terminal device 110 requests setting of second short distance communication tethering in advance from the communication terminal device 120 through first short distance communication, and receives, when the second short distance communication tethering is activated through re-connection of the first short distance communication, service connection or service data from the service providing device 130 through the activated second short distance communication tethering.

The communication terminal device 120 performs communication with the service providing device 130 through the communication network. Such a communication terminal device 120 may form a data communication channel with the service providing device 130 in response to a tethering service request of the vehicle terminal device 110. The communication terminal device 120 sets second short distance communication tethering with the vehicle terminal device 110 through first short distance communication, activates the set second short distance communication tethering when re-connected with the vehicle terminal device 110 through the first short distance communication, and relays service connection or service data between the vehicle terminal device 110 and the service providing device 130 through the activated second short distance communication tethering.

The service providing device 130 forms a data communication channel with the communication terminal device 120 though the communication network. Such a service providing device 130 stores various data, and accesses the communication network to transmit data required for a corresponding data service to the communication terminal device 120 in accordance with an access request of the communication terminal device 120. The service providing device 130 provides service connection or service data to the vehicle terminal device 110 through the relayed communication terminal device 120.

Hereinafter, a case in which first short distance communication according to an embodiment of the present invention is Bluetooth, and second short distance communication is Wi-Fi will be described.

The vehicle terminal device 110 and the communication terminal device 120 are automatically registered with each other when pairing between the devices 110 and 120 is performed in advance using Bluetooth. Next, when a vehicle is started by a user, the vehicle terminal device 110 attempts to establish Bluetooth connection with the communication terminal device 120. When the Bluetooth connection between the vehicle terminal device 110 and the communication terminal device 120 is established, the communication terminal device 120 on standby activates Wi-Fi tethering set in advance, and allows Wi-Fi tethering connection of the vehicle terminal device 110. That is, when the vehicle terminal device 110 and the communication terminal device 120 are connected through Bluetooth, the communication terminal device 120 may operate an application related to Wi-Fi tethering by turning on Wi-Fi, and perform Wi-Fi connection between the vehicle terminal device 119 and the communication terminal device 120 with respect to the vehicle terminal device 110 registered in advance. In this instance, the communication terminal device 120 may perform various predefined automated operations.

Thereafter, when the vehicle is turned off by the user, the Bluetooth connection between the vehicle terminal device 110 and the communication terminal device 120 is disconnected. In this instance, the communication terminal device 120 detects disconnection of the Bluetooth connection to deactivate a Wi-Fi tethering function. This is intended to reduce battery consumption of the communication terminal device 120.

The case in which the first short distance communication is Bluetooth and the second short distance communication is Wi-Fi has been described as one embodiment of the present invention, but the embodiments of the present invention are not limited to the vehicle terminal device 110 and the communication terminal device 120 which have both the first short distance communication and the second short distance communication. That is, any device capable of performing single short distance communication may be applicable. In addition, any devices which can perform short distance communication through which signals are transmitted and received may be applicable as the vehicle terminal device 110 and the communication terminal device 120 according to an embodiment of the present invention. For example, such short distance communication may include any short distance communication through which short distance communication such as Bluetooth communication, infrared communication, Zigbee communication, UWB communication, NFC communication, Wi-Fi communication, and the like are possible.

Meanwhile, such a communication connection function using Bluetooth may be used not only in vehicles but also in areas. When Bluetooth devices are installed at several places of specific areas and then operations according to the Bluetooth devices are respectively set, the communication terminal device 120 may provide different communication services depending on areas.

Figure 2:
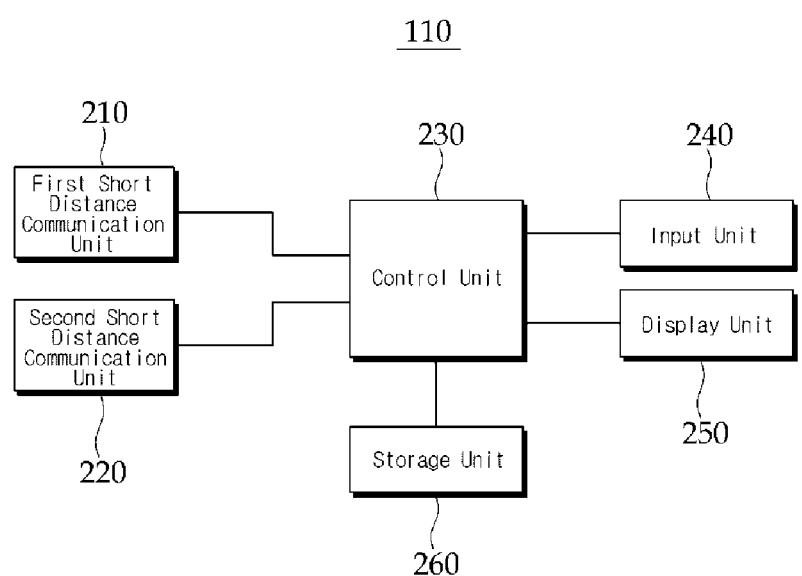
FIG. 2 is a configuration diagram of a vehicle terminal device in the tethering providing system of FIG. 1 according to an embodiment of the present invention.

FIG. 2 is a configuration diagram of a vehicle terminal device in the tethering providing system of FIG. 1 according to an embodiment of the present invention.

As shown in FIG. 2, the vehicle terminal device 110 includes a first short distance communication unit 210, a second short distance communication unit 220, a control unit 230, an input unit 240, a display unit 250, and a storage unit 260.

The first short distance communication unit 210 communicates with the communication terminal device 120 through first short distance communication. Such a first short distance communication unit 210 may include a wireless communication module and a wired communication module. The wireless communication module may include at least one of various modules such as a Bluetooth module, an infrared module, a Zigbee module, a UWB module, an NFC module, and the like, and form a short distance communication channel. The wired communication module may include a communication module of a wired cable connection method such as a USB cable, and form a cable communication channel.

The second short distance communication unit 220 communicates with the communication terminal device 120 through second short distance communication. Here, since the second short distance communication can perform data transmission at a higher speed than the first short distance communication, it is currently preferable for performing Wi-Fi communication, but short distance communication can be diversely selected according to application and performance of short distance communication, development of technologies, and the like.

The control unit 230 is a component that controls various signal flows required for operation of the vehicle terminal device 110. The control unit 230 requests setting of second short distance communication tethering in advance from the communication terminal device 120 through the first short distance communication unit 210 to store tethering setting information in the storage unit 260, transmits the tethering setting information stored in the storage unit 260 to the communication terminal device 120 through re-connection of the first short distance communication with the communication terminal device 120, and receives, when the second short distance communication tethering is activated, service connection and service data through the activated second short distance communication tethering.

Next, upon re-connecting with the communication terminal device 120 through the first short distance communication unit 210 and receiving communication termination information, the control unit 230 may display the received communication termination information so as to notify a user of the displayed information, and request service re-connection in accordance with the communication termination information from the communication terminal device 120 in response to a request of the user.

The input unit 240 is a component that generates various input signals required for driving of the vehicle terminal device 110. The input unit 240 may have various forms depending on types of the vehicle terminal device 110. For example, when the vehicle terminal device 110 is a laptop computer or a desktop computer, the input unit 240 may be a keyboard or a mouse, and in the case of a TV terminal or the like, the input unit 240 may be a button. Such an input unit 240 may include a plurality of button keys, side keys, hot keys, and the like. The signals generated by the input unit 240 may be input signals for requesting tethering services based on the communication terminal device 120, input signals for connection to the service providing device 130, various input signals required for a communication service operation process, input signals for termination of tethering services, and the like. The generated input signals may be transmitted to the control unit 230. The input unit 240 may receive user input signals for first short distance communication and setting of second short distance communication tethering from the user.

The display unit 250 may include a flat panel display device employing a thin film transistor such as a liquid crystal display device, an OLED display device, or the like. The display unit 250 may be provided in the form of a touch screen including a touch panel to act as an input means. The display unit 250 displays a communication setting screen for the first short distance communication and the setting of the second short distance communication tethering. Such a display unit 250 is a component that outputs various screens obtained in a process of operating the vehicle terminal device 110. For example, the display unit 250 may output screens in accordance with basic characteristics of the vehicle terminal device 110, for example, a broadcast reception screen, a current status checking screen of a vehicle, a standby screen output in accordance with schedule information after completing computer booting, and the like. In particular, the display unit 250 of the present invention may output a menu screen including tethering service items, a search screen of the communication terminal device 120 for the use of tethering services, a screen for requesting tethering services from the searched communication terminal device 120, a connection screen to the service providing device 130, various communication service screens provided by the service providing device 130 in accordance with the connection to the service providing device 130, and the like.

The storage unit 260 is a component that stores various application programs for operating the vehicle terminal device 110, and stores various data generated in accordance with the operation of the vehicle terminal device 110. In particular, the storage unit 260 stores tethering setting information for setting of the second short distance communication tethering.

Figure 3:
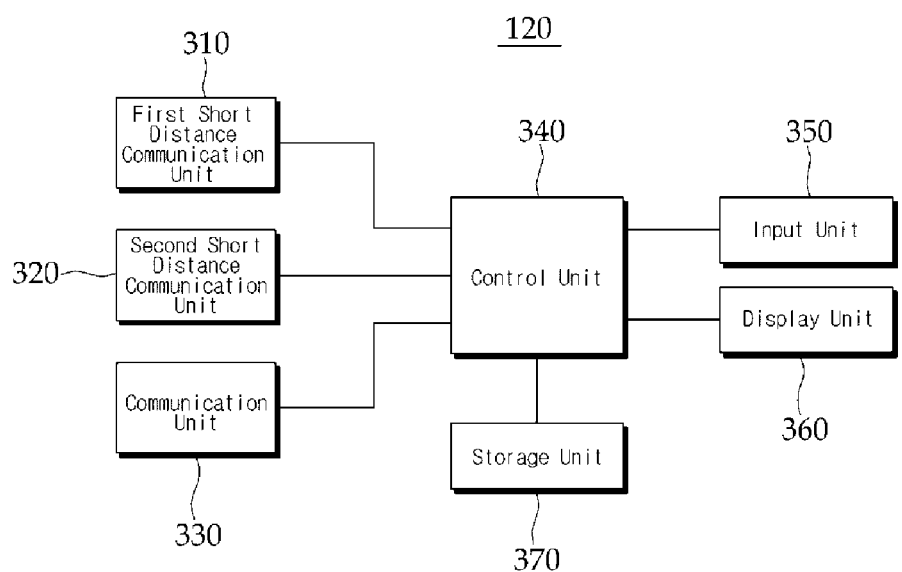
FIG. 3 is a configuration diagram of a communication terminal device in the tethering providing system of FIG. 1 according to an embodiment of the present invention.

FIG. 3 is a configuration diagram of a communication terminal device in the tethering providing system of FIG. 1 according to an embodiment of the present invention.

As shown in FIG. 3, the communication terminal device 120 includes a first short distance communication unit 310, a second short distance communication unit 320, a communication unit 330, a control unit 340, an input unit 350, a display unit 360, and a storage unit 370.

The first short distance communication unit 310 communicates with the vehicle terminal device 110 through first short distance communication. Such a first short distance communication unit 310 may include a wireless communication module and a wired communication module. The wireless communication module may include at least one of various communication modules such as a Bluetooth module, an infrared module, a Zigbee module, a UWB module, an NFC module, and the like, and form a short distance communication channel. The wired communication module may include a communication module of a wired cable connection method such as a USB cable, and form a cable communication channel.

The second short distance communication unit 320 communicates with the vehicle terminal device 110 through second short distance communication. Such a second short distance communication unit 320 may receive various signals for a tethering service relaying function of the communication terminal device 120, for example, connection requesting data to the service providing device 130 which is transmitted by the vehicle terminal device 110, data for authentication of the service providing device 130, and the like, and transmit the received data to the service providing device 130 through the communication unit 330 in accordance with control of the control unit 340. Next, the second short distance communication unit 320 may transmit, to the vehicle terminal device 110 in accordance with the control of the control unit 340, communication service data provided by the service providing device 130 which has been received through the communication unit 330.

The communication unit 330 communicates with the service providing device 130 through the communication network. The communication unit 330 is a component that supports the communication terminal device 120 to be connected to the service providing device 130 for the purpose of tethering service support. Such a communication unit 330 may be connected to a communication network such as a mobile communication network or an Internet network to form a communication channel, and transmit and receive signals required for the tethering service support of the communication terminal device 120 according to the present invention.

The control unit 340 sets second short distance communication tethering through the vehicle terminal device 110 and the first short distance communication unit 310, verifies identification information of the vehicle terminal device 110 and tethering setting information when re-connected with the vehicle terminal device 110 through the first short distance communication unit 310, and activates the set second short distance communication tethering. Next, the control unit 340 relays service connection and service data between the vehicle terminal device 110 and the service providing device 130 through the activated second short distance communication tethering. Here, when a plurality of vehicle terminal devices 110 are provided, the control unit 340 may allocate a mutually different communication channel of second short distance communication to each of the plurality of vehicle terminal devices, and provide second short distance communication tethering to the plurality of vehicle terminal devices through the allocated mutually different communication channels.

When the second short distance communication tethering with the vehicle terminal device 110 is activated and then the first short distance communication with the vehicle terminal device 110 is terminated, the control unit 340 may deactivate the activated second short distance communication tethering. Next, when the activated second short distance communication tethering is deactivated, the control unit 340 stores communication termination information about the service connection or the service data which is provided from the service providing device 130. Next, when the communication terminal device is re-connected with the vehicle terminal device 110 through the first short distance communication, the control unit 340 may transmit the stored communication termination information to the vehicle terminal device 110.

Meanwhile, when a charge amount of a battery provided in the communication terminal device 120 is equal to or less than a predetermined threshold value, the control unit 340 may deactivate the activated second short distance communication tethering, and transmit a deactivation notifying message of the second short distance communication tethering to the vehicle terminal device 110.

The input unit 350 receives user input signals for the first short distance communication and the setting of the second short distance communication tethering from a user. The input unit 350 may include a plurality of input keys, function keys, and the like for receiving numeric or text information and setting various functions.

The function keys may include direction keys, side keys, shortcut keys, and the like which are set so as to perform specific functions. In addition, the input unit 350 may generate key input signals associated with function control of the communication terminal device 120, and transmit the generated signals to the control unit 340.

The display unit 360 may include a display panel which displays user data input by a user, function setting information, various information provided to the user, and the like as well as various menu screens of the communication terminal device 120 like the display unit 250 of the vehicle terminal device 110, and include a touch panel disposed on the display panel to support a function of a touch screen. Such a display unit 360 may include a flat display panel formed based on a thin film transistor such as a liquid crystal display, an organic light emitted diode (OLED), or the like. When supporting the function of the touch screen capable of generating specific input signals based on the touch panel, the display unit 360, the display unit 360 may support a function of an input means. In particular, the display unit 360 displays a communication setting screen for the first short distance communication and the setting of the second short distance communication tethering.

The storage unit 370 may store data input from the input unit 350, data transmitted by the vehicle terminal device 110, and the like as well as a program required for performing the function of the communication terminal device 120.

Such a storage unit 370 may mainly include a program area and a data area. The program area may store an operating system (OS) for controlling overall operations of the communication terminal device 120, an application program required for reproducing multimedia content, and the like. In particular, the storage unit 370 stores identification information of the vehicle terminal device 110 and tethering setting information for setting of the second short distance communication tethering.

Figure 4:
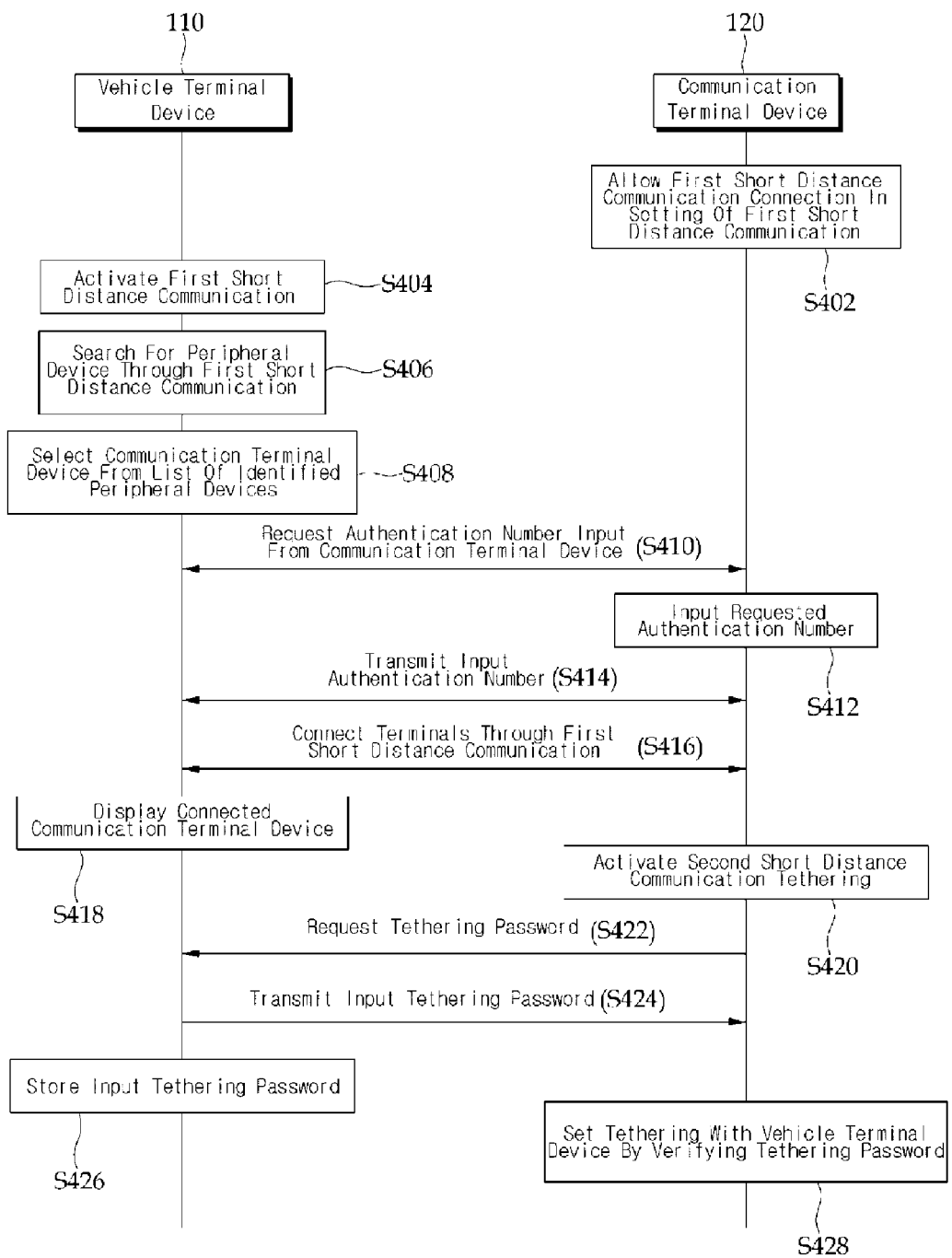
FIG. 4 is a flowchart illustrating a tethering setting method between a vehicle terminal device and a communication terminal device according to an embodiment of the present invention.

FIG. 4 is a flowchart illustrating a tethering setting method between a vehicle terminal device and a communication terminal device according to an embodiment of the present invention.

In step S402, the communication terminal device 120 allows first short distance communication connection in setting of first short distance communication in accordance with an input of a user.

Meanwhile, in step S404, the vehicle terminal device 110 activates the first short distance communication.

Next, in step S406, the vehicle terminal device 110 searches for a peripheral device through the activated first short distance communication.

In step S408, the vehicle terminal device 110 selects the communication terminal device 120 for setting of second short distance communication tethering from a list of the identified peripheral devices.

Next, in step S410, the vehicle terminal device 110 requests input of an authentication number from the communication terminal device 120.

In step S412, the communication terminal device 120 inputs the authentication number in an authentication number input screen in accordance with the request of the vehicle terminal device 110.

Next, in step S414, the communication terminal device 120 transmits the input authentication number to the vehicle terminal device 110.

Then, in step S416, the vehicle terminal device 110 and the communication terminal device 120 are connected to each other through the first short distance communication.

Next, in step S418, the vehicle terminal device 110 displays the communication terminal device 120 connected through the first short distance communication on a connection completion screen.

Next, in step S420, the communication terminal device 120 activates the second short distance communication tethering.

Next, in step S422, the communication terminal device 129 requests a tethering password for connection of the activated second short distance communication tethering from the vehicle terminal device 110.

Then, in step S424, the vehicle terminal device 110 transmits the tethering password input by the user to the communication terminal device 120.

In addition, in step S426, the vehicle terminal device 110 stores the input tethering password.

On the other hand, in step S428, the communication terminal device 120 verifies the tethering password received from the vehicle terminal device 110 and sets the second short distance communication tethering of the vehicle terminal device 110.

Meanwhile, an immediate connection mode in which the vehicle terminal device 110 is connected immediately when the second short distance communication tethering is activated in the communication terminal device 120 may be performed. That is, if the communication terminal device 120 has already requested and received a password from the vehicle terminal device 110 once, the password need not be requested by the communication terminal device 120 again. When the communication terminal device 120 sets the second short distance communication tethering using the previously input password through communication between the communication terminal device 120 and the vehicle terminal device 110, the vehicle terminal device 110 may be immediately connected to the second short distance communication tethering without any further input of the password.

Figure 5:
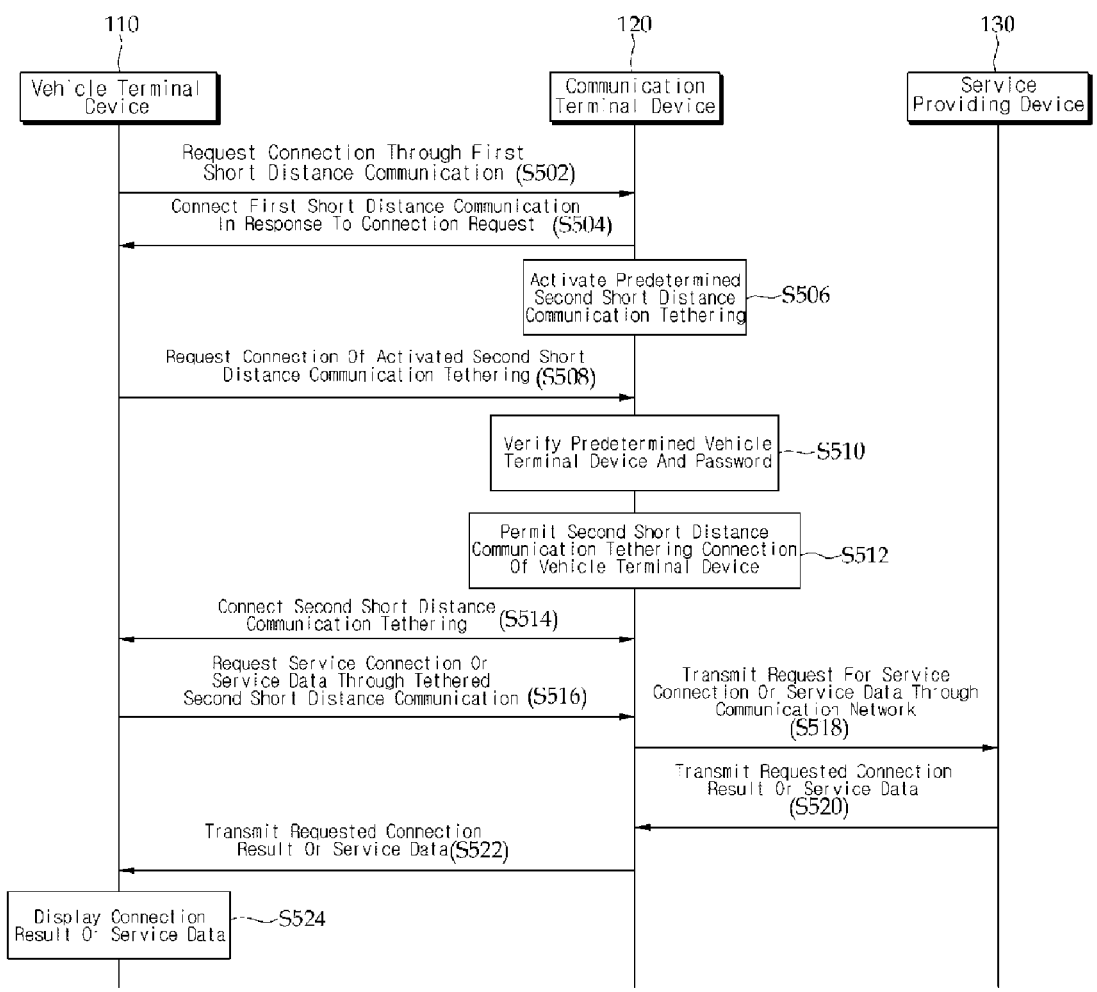
FIG. 5 is a flowchart illustrating a tethering providing method in a tethering providing system according to an embodiment of the present invention.

FIG. 5 is a flowchart illustrating a tethering providing method in a tethering providing system according to an embodiment of the present invention.

In step S502, the vehicle terminal device 110 requests connection to the communication terminal device 120 from the communication terminal device 120 through first short distance communication.

In step S504, the communication terminal device 120 is connected to the vehicle terminal device 110 through the first short distance communication in response to the connection request of the vehicle terminal device 110.

Next, in step S506, the communication terminal device 120 activates predetermined second short distance communication tethering as described in FIG. 4.

Then, in step S508, the vehicle terminal device 110 requests connection of the activated second short distance communication tethering from the communication terminal device 120.

In step S510, the communication terminal device 120 verifies predetermined identification information of the vehicle terminal device 110 received from the vehicle terminal device 110 together with the tethering connection request, and verifies a password input in advance for the purpose of the tethering connection.

In step S512, when the predetermined identification information of the vehicle terminal device 110 and the password are verified, the communication terminal device 120 allows the connection of the second short distance communication tethering of the vehicle terminal device 110.

Then, in step S514, the vehicle terminal device 110 is connected through the second short distance communication tethering of the communication terminal device 120.

Next, in step S516, the vehicle terminal device 110 requests service connection or service data from the communication terminal device 120 through the tethered second short distance communication.

Then, in step S518, the communication terminal device 120 transmits the request for the service connection or the service data to the service providing device 130 through the communication network.

In step S520, the service providing device 130 transmits the requested connection result or service data to the communication terminal device 120 through the communication network.

Next, in step S522, the communication terminal device 120 receives the requested connection result or service data from the service providing device 130, and transmits the received information to the vehicle terminal device 110.

Next, in step S524, the vehicle terminal device 110 displays the connection result or the service data so as to notify a user of the displayed information.

Figure 6:
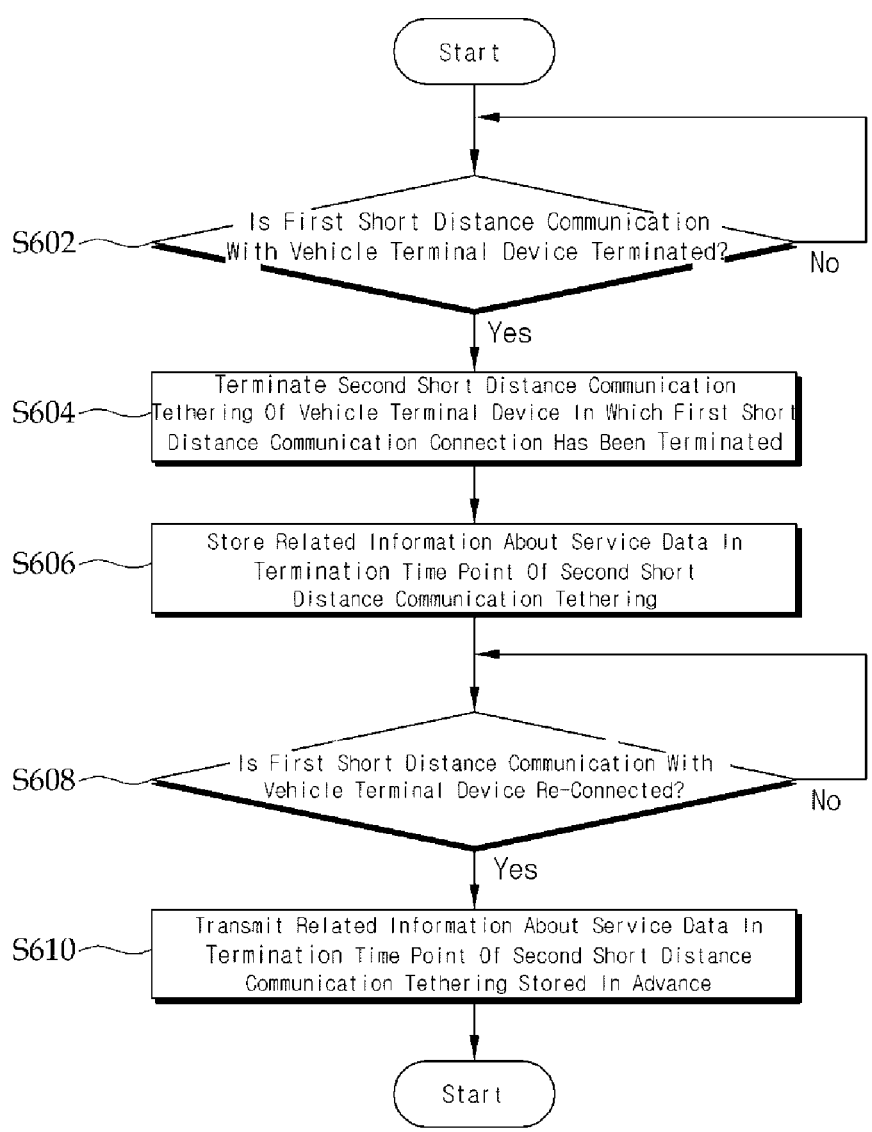
FIG. 6 is a flowchart illustrating a tethering termination method in a communication terminal device according to an embodiment of the present invention.

FIG. 6 is a flowchart illustrating a tethering termination method in a communication terminal device according to an embodiment of the present invention.

In step S602, the communication terminal device 120 monitors whether first short distance communication with the vehicle terminal device 110 is terminated.

In step S604, when the first short distance communication with the vehicle terminal device 110 is determined to be terminated based on the monitored result, the communication terminal device 120 terminates second short distance communication tethering of the vehicle terminal device 110 in which the first short distance communication connection has been terminated.

Next, in step S606, the communication terminal device 120 stores related information about service data in a termination time point of the second short distance communication tethering.

Next, in step S608, the communication terminal device 120 monitors whether the first short distance communication with the vehicle terminal device 110 is re-connected.

In step S610, when the first short distance communication with the vehicle terminal device 110 is determined to be re-connected based on the monitored result, the communication terminal device 120 transmits, to the vehicle terminal device 110, the previously stored related information about service data in the termination time point of the second short distance communication tethering.

FIGS. 7 to 10 are diagrams illustrating examples of a device connection screen using short distance communication in a vehicle terminal device according to an embodiment of the present invention.

Figure 7:
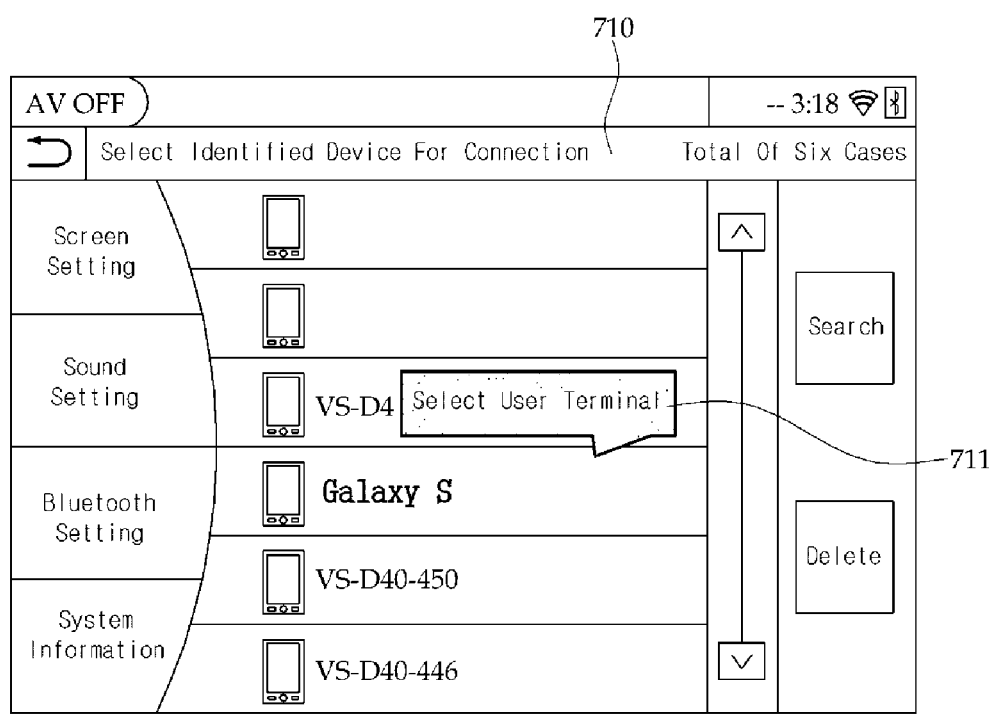
FIGS. 7 to 10 are diagrams illustrating examples of a device connection screen using short distance communication in a vehicle terminal device according to an embodiment of the present invention.

As shown in FIG. 7, the vehicle terminal device 110 searches for peripheral Bluetooth devices through Bluetooth, and displays the search result on a Bluetooth setting screen 710. In this instance, the vehicle terminal device 110 displays the identified Bluetooth devices so as to notify a user of the searched result, and receives, from a user, a selection of a device 711 corresponding to the communication terminal device from a search list.

Figure 8:
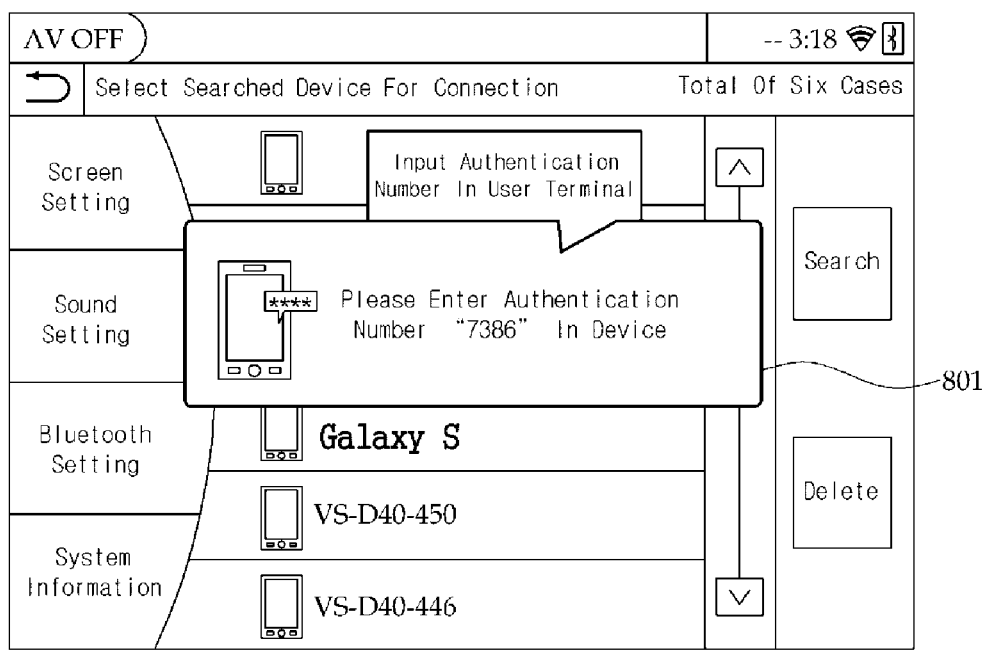

Next, as shown in FIG. 8, the vehicle terminal device 110 displays, on the Bluetooth setting screen 710, a message 801 for prompting the communication terminal device 120 to input an authentication number for Bluetooth communication connection.

Figure 9:
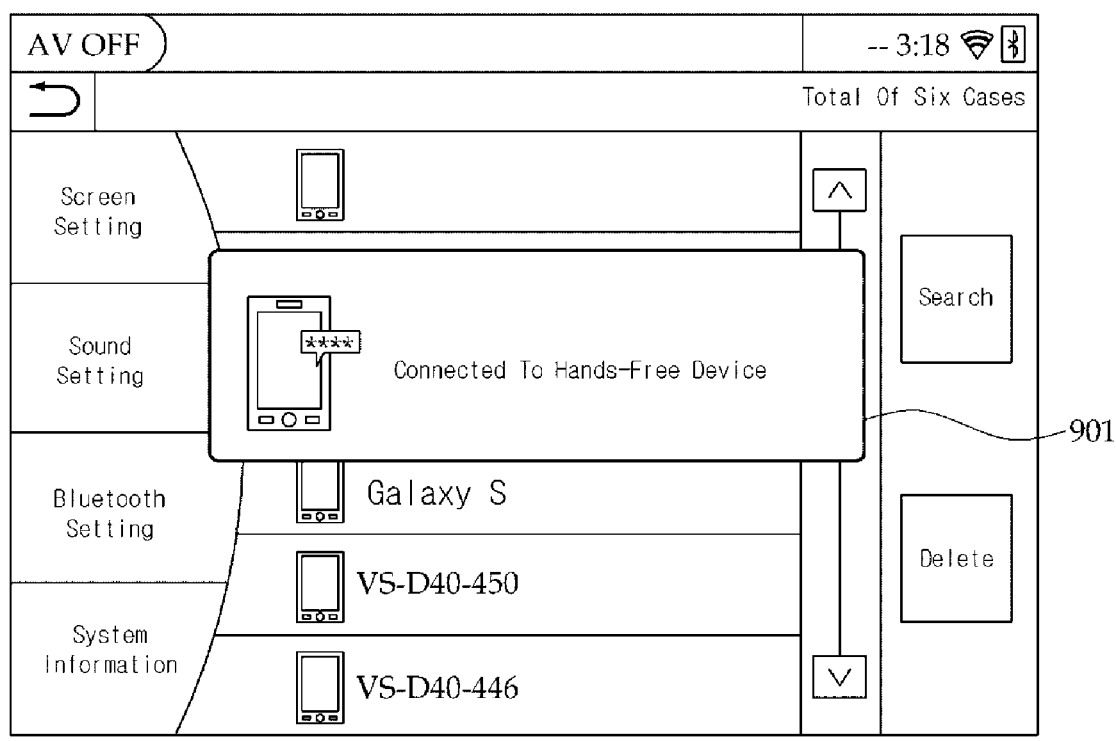

Then, as shown in FIG. 9, the vehicle terminal device 110 displays a communication connection message 901 indicating that connection to the communication terminal device 120 that is a hands-free device is established so as to notify the user of the displayed information.

Figure 10:
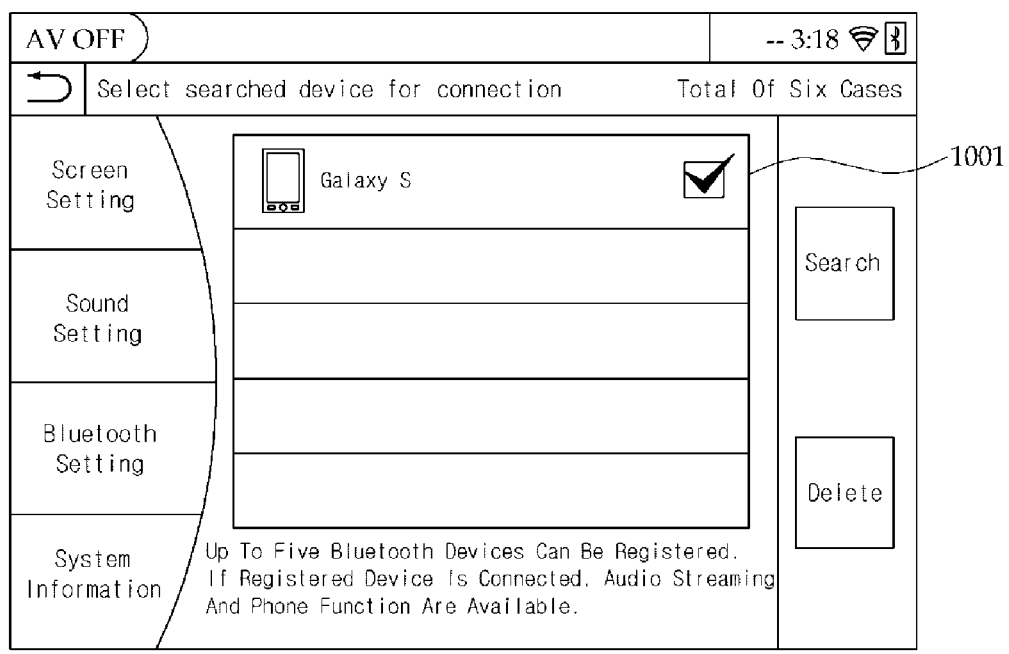

As shown in FIG. 10, the vehicle terminal device 110 displays the communication terminal device 120 connected through Bluetooth on a communication connection device list 100.

Next, the vehicle terminal device 110 performs the tethering setting process of FIG. 4 concerning Wi-Fi tethering setting of the communication terminal device 120 when connected to the communication terminal device 120 through Bluetooth.

Figure 11:
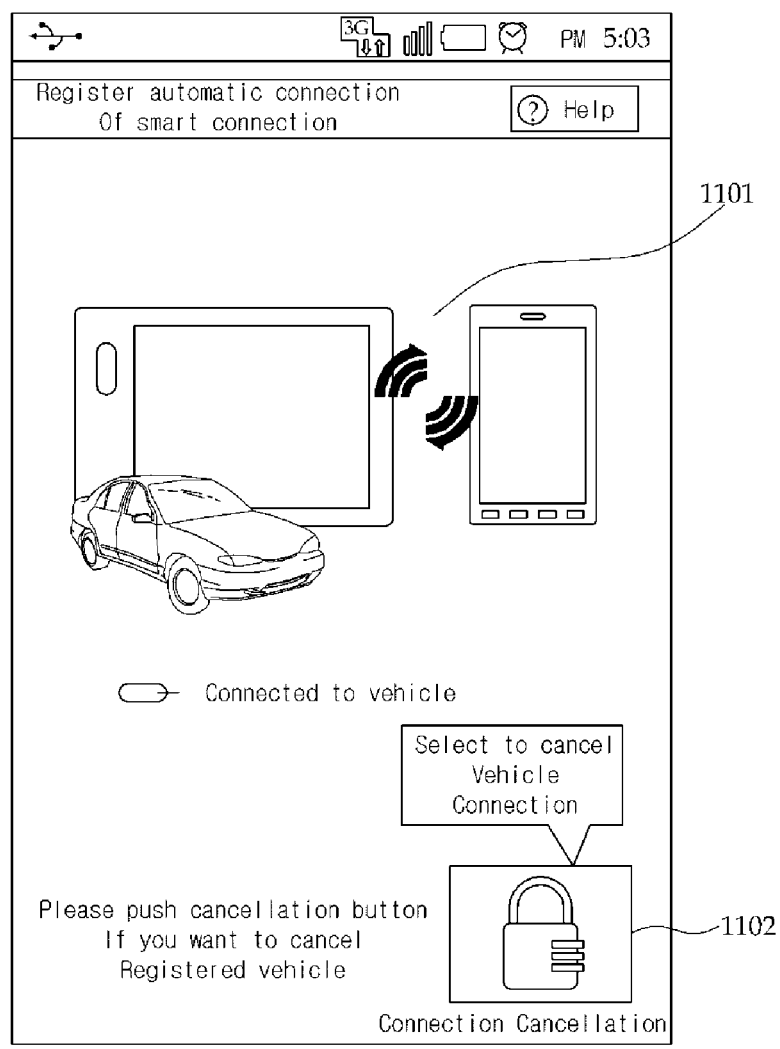
FIGS. 11 to 13 are diagrams illustrating examples of an automatic connection registration screen using short distance communication in a communication terminal device according to an embodiment of the present invention.
Figure 12:
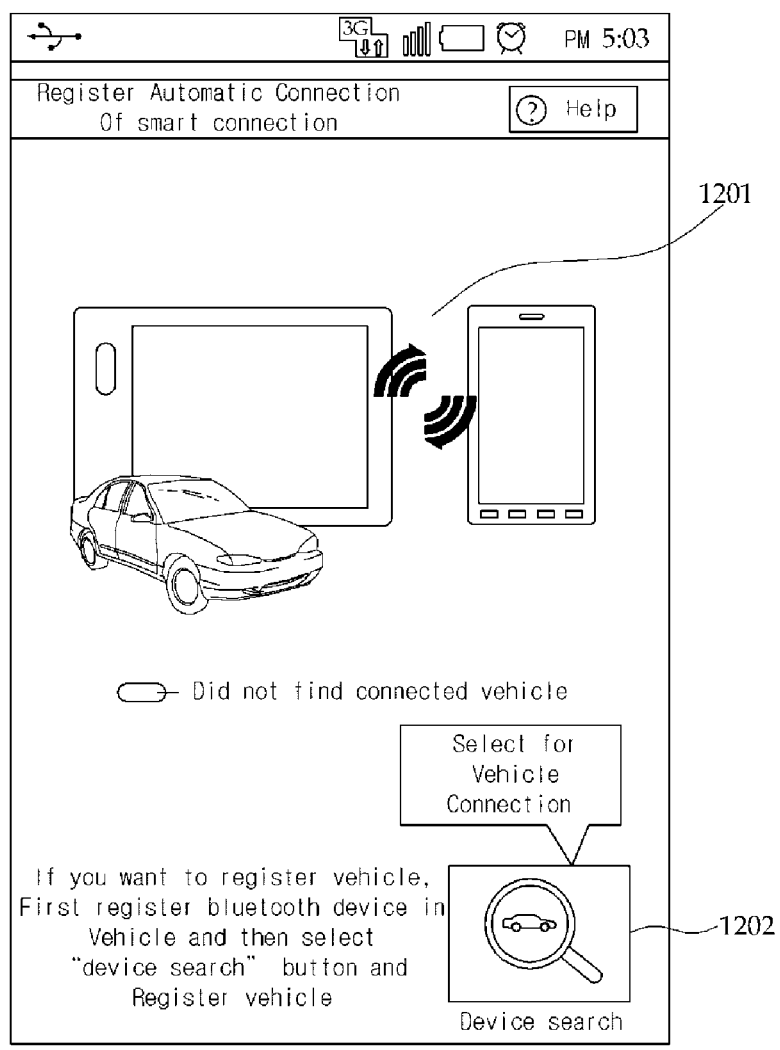
Figure 13:
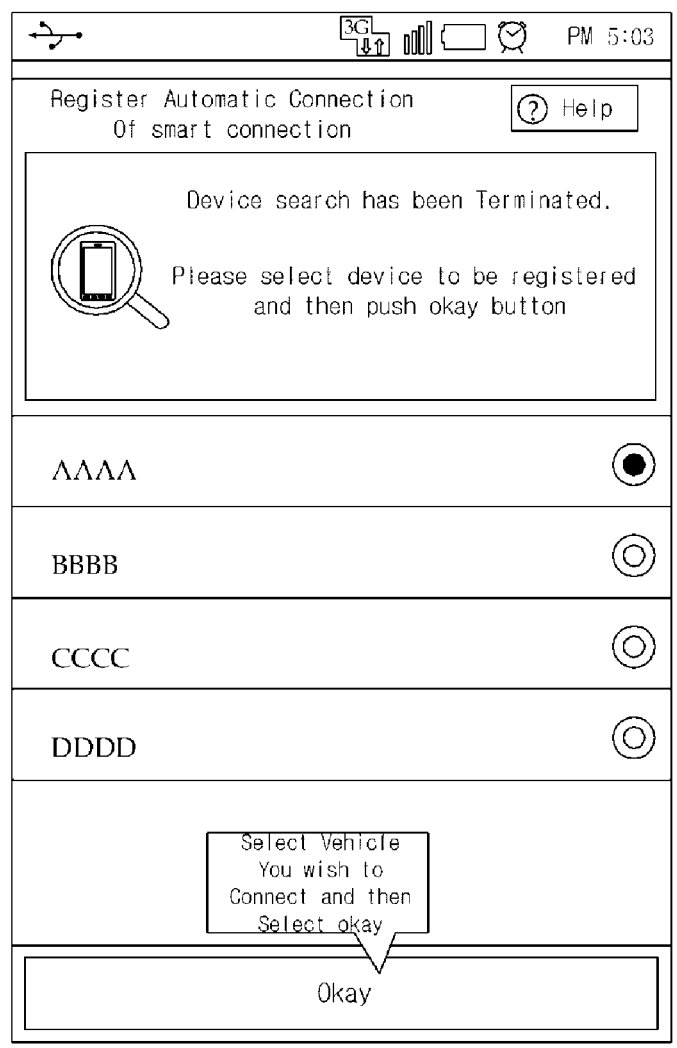

FIGS. 11 to 13 are diagrams illustrating examples of an automatic connection registration screen using short distance communication in a communication terminal device according to an embodiment of the present invention.

As shown in FIG. 11, the communication terminal device 120 displays automatic connection registration of smart connection with the vehicle terminal device 110 so as to notify a user of the displayed information. Here, the communication terminal device 120 may allow a user to cancel vehicle connection through a connection cancellation button 1102 when the user desires to cancel the vehicle connection.

When the communication terminal device 120 is connected to the vehicle terminal device 110 through Bluetooth after such vehicle connection, the communication terminal device 120 activates Wi-Fi tethering, and the vehicle terminal device 110 is connected to the activated Wi-Fi tethering. When automatically connected through the Wi-Fi tethering, the vehicle terminal device 110 receives communication services through the Wi-Fi tethering.

As shown in FIG. 12, the communication terminal device 120 displays a connection state of the smart connection with the vehicle terminal device 110 so as to notify a user of the displayed information. The communication terminal device 120 displays a result indicating that the currently connected vehicle terminal device 110 of a vehicle has not been found. Next, the communication terminal device 120 may search for a peripheral device through a device search button 1202 when a user desires vehicle connection.

As shown in FIG. 13, when the device search button 1202 is pushed by the user, the communication terminal device 120 displays peripheral devices (for example, AAAA, BBBB, CCCC, and DDDD) which are automatic connection targets of smart connection. In this instance, when the user selects the AAAA device and pushes an OK button for connection, the communication terminal device 120 may register automatic connection of smart connection and display the registered information so as to notify the user of the displayed information as shown in FIG. 11.

Meanwhile, the tethering providing method using the above-described short distance communication may be implemented by a software program, and recorded in a predetermined computer-readable recording medium.

For example, the recording medium may be a hard disk, a flash memory, RAM, ROM, or the like which is built in each reproduction apparatus, or an optical disc such as a CD-R or a CD-RW, a compact flash card, smart media, a memory stick, or a multimedia card.

In this case, the program recorded in the computer-readable recording medium may execute a tethering setting request process of requesting setting of second short distance communication tethering in advance from the communication terminal device through first short distance communication, a tethering setting process of setting the second short distance communication tethering by storing tethering setting information generated by the tethering setting request process, a tethering request process of requesting the second short distance communication tethering by transmitting the stored tethering setting information to the communication terminal device through re-connection with the communication terminal device through the first short distance communication, and a tethering service process of receiving, when the second short distance communication tethering is activated in the communication terminal device, service connection or service data through the activated second short distance communication tethering.

Meanwhile, the program recorded in the computer-readable recording medium may execute a first short distance communication connection process of being connected with the vehicle terminal device through first short distance communication, a tethering setting process of setting second short distance communication tethering with the vehicle terminal device through the first short distance communication, a first short distance communication re-connection process of being re-connected with the vehicle terminal device through the first short distance communication, a tethering activation process of activating the set second short distance communication tethering by verifying identification information of the vehicle terminal device and tethering setting information, and a tethering service providing process of relaying service connection or service data between the vehicle terminal device and the service providing device through the activated second short distance communication tethering.

Meanwhile, as described above, the program recorded in the computer-readable recording medium in a case in which the vehicle terminal device 110 and the communication terminal device are integrally mounted may execute a tethering setting process of setting second short distance communication tethering in advance by storing tethering setting information through first short distance communication; a first short distance communication re-connection process of being re-connected through the first short distance communication; a tethering activation process of activating the set second short distance communication tethering by verifying the stored tethering setting information through re-connection of the first short distance communication; and a tethering service providing process of receiving service connection and service data by communicating with the service providing device through the activated second short distance communication tethering.

Implementations of the subject matter and the functional operations described in this specification can be implemented in digital electronic circuitry, or in computer software, firmware, or hardware, including the structures disclosed in this specification and their structural equivalents, or in combinations of one or more of them. Implementations of the subject matter described in this specification can be implemented as one or more computer program products, i.e., one or more modules of computer program instructions encoded on a computer readable medium for execution by, or to control the operation of, a data processing apparatus.

While operations are depicted in the drawings in a particular order, this should not be understood as indicating that such operations need be performed in the particular order shown, or that all illustrated operations need be performed in order to achieve desirable results. In certain circumstances, multitasking and parallel processing may be advantageous.

In addition, specific embodiments have been described in the present specification. The embodiments are within the scope of the following claims. For example, the actions recited in the claims can be performed in a different order and still achieve desirable results.

While the invention has been shown and described with reference to certain exemplary embodiments thereof, it will be understood by those skilled in the art that various changes in form and details may be made therein without departing from the spirit and scope of the invention as defined by the appended claims.

INDUSTRIAL APPLICABILITY

According to the present invention, second short distance communication tethering between a vehicle terminal device and a communication terminal device is set in accordance with whether first short distance communication is established, activated when the vehicle terminal device and the communication terminal device are re-connected through the first short distance communication, and deactivated when the first short distance communication is terminated, thereby providing high-speed data connection through the second short distance communication tethering while reducing battery consumption of the communication terminal device.

The invention claimed is:

1. A tethering providing system using short distance communication, the system comprising:
  a communication terminal device configured to perform first short distance communication and second short distance communication tethering;
  a vehicle terminal device configured to
    connect to the communication terminal device through the first short distance communication,
    request a setting of the second short distance communication tethering from the communication terminal device, and
    when the second short distance communication tethering is activated by re-connection to the communication terminal device through the first short distance communication, perform service connection through the activated second short distance communication tethering;
  a service providing device configured to provide the service connection to the vehicle terminal device through the communication terminal device in the activated second short distance tethering,
  wherein, when the first short distance communication of the communication terminal device with the vehicle terminal device is connected, the communication terminal device is configured to
    set the second short distance communication tethering with the vehicle terminal device through the connected first short distance communication,
    activate the set second short distance communication tethering with the vehicle terminal device, and
    relay the service connection through the activated second short distance communication tethering, and
  wherein, when the first short distance communication of the communication terminal device with the vehicle terminal device is terminated, the communication terminal device is configured to deactivate the activated second short distance communication tethering.

2. A communication terminal device, comprising:
  a first short distance communication unit configured to communicate with a vehicle terminal device through first short distance communication;
  a second short distance communication unit configured to communicate with the vehicle terminal device through second short distance communication tethering;
  a communication unit configured to communicate with a service providing device through a communication network;

a storage unit configured to store identification information of the vehicle terminal device and tethering setting information for setting the second short distance communication tethering; and a control unit configured to
- set the second short distance communication tethering with the vehicle terminal device through the first short distance communication unit,
- when the vehicle terminal device is connected through the first short distance communication unit, activate the set second short distance communication tethering by verifying the identification information of the vehicle terminal device and the tethering setting information,
- relay service connection between the vehicle terminal device and the service providing device through the activated second short distance communication tethering, and
- when the first short distance communication with the vehicle terminal device is terminated, deactivate the activated second short distance communication tethering.

3. The communication terminal device of claim 2, wherein the control unit is configured to
- when the activated second short distance communication tethering is deactivated, store communication termination information about the service connection provided from the service providing device, and
- when re-connection of the first short distance communication with the vehicle terminal device is established, transmit the stored communication termination information to the vehicle terminal device.

4. The communication terminal device of claim 2, wherein, when a plurality of vehicle terminal devices are available, the control unit is configured to
- allocate a mutually different communication channel of second short distance communication to each of the plurality of vehicle terminal devices, and
- provide the second short distance communication tethering to the plurality of vehicle terminal devices through the allocated mutually different communication channels.

5. The communication terminal device of claim 2, wherein, when a charge amount of a battery provided in the communication terminal device is equal to or less than a predetermined threshold value, the control unit is configured to
- deactivate the activated second short distance communication tethering with the communication terminal device, and
- transmit a deactivation notifying message of the second short distance communication tethering to the vehicle terminal device.

6. A tethering providing method, the method performed by a communication terminal device, the communication terminal device including a control unit configured to execute the method, the method comprising:
- performing connection with a vehicle terminal device through first short distance communication;
- setting second short distance communication tethering with the vehicle terminal device through the first short distance communication;
- performing re-connection with the vehicle terminal device through the first short distance communication;
- activating the set second short distance communication tethering by verifying identification information of the vehicle terminal device and tethering setting information;
- relaying service connection between the vehicle terminal device and a service providing device through the activated second short distance communication tethering; and
- when the first short distance communication with the vehicle terminal device is terminated, deactivating the activated second short distance communication tethering.

7. The tethering providing method of claim 6, further comprising:
- when the activated second short distance communication tethering is deactivated, receiving and storing communication termination information about the service connection provided from the service providing device;
- performing re-connection of the first short distance communication with the vehicle terminal device; and
- transmitting the stored communication termination information to the vehicle terminal device.

8. The tethering providing method of claim 6, wherein, when a plurality of vehicle terminal devices are available, the relaying of the service connection includes
- allocating a mutually different communication channel of second short distance communication to each of the plurality of vehicle terminal devices, and
- providing the second short distance communication tethering to the plurality of vehicle terminal devices through the allocated mutually different communication channels.

9. The tethering providing method of claim 6, wherein, when a charge amount of a battery provided in the communication terminal device is equal to or less than a predetermined threshold value, the deactivating of the activated second short distance communication tethering includes
- deactivating the activated second short distance communication tethering with the terminal communication device, and
- transmitting a deactivation notifying message of the second short distance communication tethering to the vehicle terminal device.

10. A non-transitory computer-readable recording medium recording a computer program for causing, when executed by a control unit of a communication terminal device, the control unit to execute a method of providing tethering, the method comprising:
- performing connection with a vehicle terminal device through first short distance communication;
- setting second short distance communication tethering with the vehicle terminal device through the first short distance communication;
- performing re-connection with the vehicle terminal device through the first short distance communication;
- activating the set second short distance communication tethering by verifying identification information of the vehicle terminal device and tethering setting information;
- relaying service connection between the vehicle terminal device and a service providing device through the activated second short distance communication tethering; and
- when the first short distance communication with the vehicle terminal device is terminated, deactivating the activated second short distance communication tethering.

* * * * *